(12) United States Patent
Gupta (10) Patent No.: US 9,473,240 B2
(45) Date of Patent: Oct. 18, 2016

(54) METHOD AND APPARATUS FOR PROVIDING TWISTED PAIR MULTILINK COMMUNICATIONS

(71) Applicant: Futurewei Technologies, Inc., Plano, TX (US)

(72) Inventor: Sanjay Gupta, Pleasanton, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/657,796

(22) Filed: Mar. 13, 2015

(65) Prior Publication Data

US 2015/0263809 A1 Sep. 17, 2015

Related U.S. Application Data (60) Provisional application No. 61/953,472, filed on Mar. 14, 2014, provisional application No. 61/971,888, filed on Mar. 28, 2014.

(51) Int. Cl.
*H04J 14/00* (2006.01)
*H04B 10/25* (2013.01)
(Continued)

(52) U.S. Cl.
CPC ............ *H04B 10/25* (2013.01); *H04B 3/32* (2013.01); *H04B 10/27* (2013.01)

(58) Field of Classification Search
CPC ........ H04B 10/25; H04B 3/32; H04B 10/27; H04B 10/0775; H04B 10/035; H04B 10/0795; H04B 10/85; H04B 10/07955; H04B 10/07957; H04B 10/0799; H04B 3/487; H04B 3/46; H04B 1/1027; H04B 10/272; H04B 2001/1045; H04J 14/0227; H04J 14/0221; H04J 14/0282; H04M 3/34; H04L 1/00

USPC .............. 398/25–28, 30–33, 36, 38, 66–72
See application file for complete search history.

(56) References Cited

U.S. PATENT DOCUMENTS

| 7,046,751 B1 * | 5/2006 | Kantschuk | H04L 12/2856 370/201 |
| 8,204,100 B2 * | 6/2012 | Schenk | H04B 3/32 330/149 |
| 8,848,555 B2 * | 9/2014 | Lindqvist | H04B 3/32 370/252 |

(Continued)

FOREIGN PATENT DOCUMENTS

| CN | 1881912 A | 12/2006 |
| CN | 101197797 A | 6/2008 |

(Continued)

*Primary Examiner* — Hibret Woldekidan
(74) *Attorney, Agent, or Firm* — Conley Rose, P.C.; Grant Rodolph; Jonathan K. Polk (57) ABSTRACT

A communication system, device and method for providing twisted pair multilink communications are provided. The system includes a first operator end terminal unit configured to couple to a first customer premises equipment (CPE) via a first twisted pair and configured to exchange first communications with the first CPE for transmission of a first part of traffic data of the first CPE over a first communication link on a first twisted pair. The system further includes a second operator end terminal unit configured to couple to a second CPE via a second twisted pair and configured to exchange second communications with the first CPE for transmission of a second part of traffic data of the first CPE over a second communication link that is a crosstalk link induced by the second twisted pair to the first twisted pair.

23 Claims, 6 Drawing Sheets

(51) Int. Cl.
*H04B 10/27* (2013.01)
*H04B 3/32* (2006.01)

(56) References Cited

U.S. PATENT DOCUMENTS

| | | | | |
|---|---|---|---|---|
| 8,958,544 | B2* | 2/2015 | Mermans | H04B 3/32 370/201 |
| 9,014,291 | B2* | 4/2015 | Gao | H04M 11/062 375/219 |
| 2004/0258223 | A1* | 12/2004 | Rahamim | H04B 3/32 379/93.28 |
| 2007/0047631 | A1* | 3/2007 | Bostoen | H04B 3/487 375/222 |
| 2008/0188185 | A1* | 8/2008 | Shi | H04L 5/0007 455/67.13 |
| 2009/0073868 | A1* | 3/2009 | Guenach | H04L 27/2601 370/201 |
| 2010/0177838 | A1* | 7/2010 | Schenk | H04B 3/32 375/285 |
| 2010/0329444 | A1* | 12/2010 | Ashikhmin | H04B 3/32 379/406.06 |
| 2012/0075984 | A1* | 3/2012 | Cendrillon | H04B 3/32 370/201 |
| 2012/0269289 | A1* | 10/2012 | Schenk | H04B 3/32 375/296 |
| 2013/0208579 | A1* | 8/2013 | Strobel | H04B 3/32 370/201 |
| 2014/0153630 | A1* | 6/2014 | Strobel | H04L 1/0001 375/229 |
| 2015/0280892 | A1* | 10/2015 | Verbin | H04L 5/0007 370/294 |
| 2015/0341487 | A1* | 11/2015 | Lu | H04B 3/32 379/1.03 |
| 2016/0028434 | A1* | 1/2016 | Kerpez | H04B 3/32 379/406.02 |
| 2016/0072532 | A1* | 3/2016 | Ginis | H04B 3/32 375/267 |
| 2016/0080031 | A1* | 3/2016 | Kassel | H04M 11/062 379/406.06 |

FOREIGN PATENT DOCUMENTS

| | | |
|---|---|---|
| CN | 102308486 A | 1/2012 |
| WO | WO 2013/026479 A1 | 2/2013 |

* cited by examiner

METHOD AND APPARATUS FOR PROVIDING TWISTED PAIR MULTILINK COMMUNICATIONS

CROSS-REFERENCE TO RELATED APPLICATIONS

This application claims the benefit of U.S. Provisional Application No. 61/953,472 filed Mar. 14, 2014, entitled "MULTILINK DSL USING OUT-OF-BAND TEXT COUPLING", and U.S. Provisional Application No. 61/971,888 filed Mar. 28, 2014, entitled "MULTILINK DSL USING OUT-OF-BAND FEXT COUPLING", both of which are hereby incorporated herein by reference as if reproduced in their entireties

TECHNICAL FIELD

This disclosure refers to wired communication technologies and more particularly to twisted pair multilink communications.

BACKGROUND

In today's copper access network, a customers' achievable physical layer rate depends on the characteristics of the direct link from its terminal unit at remote end to its terminal unit at operator end, which in turn depends on the quality and length of the copper loop, the available frequency bands, line noise, etc. In an access system based on XDSL technologies, an XDSL Terminal Unit at remote end is referred to as XTU-R, and a terminal unit at operator end is referred to as XTU-O which is generally located at a central office, exchange, intermediate cabinet or Optical Network Unit, i.e. at operator end of the loop. Typically, the customers connected to the Central Offices (COs)/cabinets on longer copper loops get lower rates than those connected on shorter ones. As such, the bandwidth and services that may be offered to the customers on longer loops are limited due to the lower available rates.

In order to overcome the limitations of longer copper loops, today's network operators deploy fiber to cabinets in proximity of customers (generically called "FTTX" or "Fiber to the X", where X could refer to premises (FTTP), curb (FTTC), drop-point (FTTD), etc.). Depending on the choice of the FTTX technology used, the copper loop is shortened or completely eliminated (as in FTTP). Although these fiber connection techniques improve the rates of the customers connected on shorter copper loops, they do not help the legacy customers still on the longer copper loops.

SUMMARY

A communication system for providing twisted pair multilink communications is provided. The communication system includes a first operator end terminal unit configured to couple to a first customer premises equipment (CPE) via a first twisted pair and configured to exchange first communications with the first CPE for transmission of a first part of traffic data of the first CPE over a first communication link on a first twisted pair. The communication system includes a second operator end terminal unit configured to couple to a second CPE via a second twisted pair and configured to exchange second communications with the first CPE for transmission of a second part of traffic data of the first CPE over a second communication link that is a crosstalk link induced by the second twisted pair to the first twisted pair.

A communication device for providing twisted pair multilink communications is provided. The communication device includes a first operator end terminal unit configured to couple to a first CPE via a first twisted pair and couple to a second operator end terminal unit that is configured to a second CPE via a second twisted pair. The first operator end terminal unit is configured to exchange first communications with the first CPE for transmission of traffic data of the first CPE over a first communication link on the first twisted pair and exchange second communications with the second CPE for transmission of at least part of traffic data of the second CPE over a second communication link that is a crosstalk link induced by the first twisted pair to the second twisted pair.

A communication device for providing twisted pair multilink communications includes a memory storing a communication routine and a processing system coupled to the memory. The processing system, when executing the communication routine, is configured to exchange first communications over a first communication port, with the first communication port adapted to be coupled to a first communication link and a customer premises equipment (CPE), and exchange second communications over a second communication port, with the second communication port adapted to be coupled to a second communication link. The communication device exchanges the second communications over the second communication port in order to exchange the second communications with the CPE via crosstalk from the second communication link to the first communication link. A total communications rate for the CPE comprises a first communications rate of the first communications exchanged with the CPE combined with a second communications rate of the second communications exchanged with the CPE via crosstalk induced in the first communication link.

A method for providing twisted pair multilink communications includes in a communication device, exchanging first communications over a first communication port and a first communication link with a customer premises equipment (CPE), with the first communication link coupling the CPE to the communication device, and in the communication device, exchanging second communications over a second communications port and second communication link. The CPE exchanges the second communications over the second communication link in order to exchange the second communications with the CPE via crosstalk from the second communication link to the first communication link. A total communications rate for the CPE comprises a first communications rate of the first communications exchanged with the CPE combined with a second communications rate of the second communications exchanged with the CPE via crosstalk induced in the first communication link.

A communication device for providing twisted pair multilink communications includes a memory storing a communication routine and a processing system coupled to the memory. The processing system, when executing the communication routine, is configured to transmit a crosstalk establishment signal over a second communication link, receive crosstalk communication parameters of the first communication link in response to transmitting the crosstalk establishment signal over the second communication link, with the crosstalk communication parameters being related to crosstalk signals generated in the first communication link as a result of transmitting the crosstalk establishment signal over the second communication link, and generate crosstalk transmission parameters based on the crosstalk communication parameters of the first communication link, with the crosstalk transmission parameters being generated for use with crosstalk-intended transmissions over the second communication link.

A method for establishing twisted pair multilink communications includes in a communication device, transmitting a crosstalk establishment signal over a second communication link, in the communication device, receiving crosstalk communication parameters of the first communication link in response to transmitting the crosstalk establishment signal over the second communication link, with the crosstalk communication parameters being related to crosstalk signals generated in the first communication link as a result of transmitting the crosstalk establishment signal over the second communication link, and in the communication device, generating crosstalk transmission parameters based on the crosstalk communication parameters of the first communication link, with the crosstalk transmission parameters being generated for use with crosstalk-intended transmissions over the second communication link.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

A need has arisen for enhancing subscriber rates over copper loops in a digital subscriber line (DSL) transmission network. In accordance with the present disclosure, a system and method for providing a multilink digital subscriber line is disclosed that greatly reduces or substantially eliminates the problems associated with conventional DSL transmission techniques.

This disclosure is directed to a Multilink DSL that may be implemented using out-of-band FEXT (far end crosstalk) coupling. The techniques defined may be used to improve the link rate performance of current DSL deployments. This disclosure describes a novel technique that provides higher rate service not only to the customers directly connected to the cabinets, but also to the customers that are connected on a longer loop within the same binder. This disclosure takes advantage of the crosstalk generated between copper twisted pairs within a common binder, which creates additional usable spectrum. To share the copper twisted pair for the direct link and FEXT crosstalk link(s), one of the many available line sharing protocols may be used. Such protocols include medium access techniques such as P2P (point-to-point) and P2MP (point-to-multipoint), and multiplexing techniques such as TDM (time-division multiplexing) and FDM (frequency-division multiplexing). Though discussed in relation to DSL technology, this disclosure is applicable to other technologies besides DSL where crosstalk signals are present. Further, the discussion herein applies to any twisted pair conductor system, including but not limited to twisted pair copper wires.

The present disclosure describes many technical advantages over conventional DSL transmission techniques. For example, one technical advantage is to implement a multilink architecture for a copper wire access network to establish additional connections and improve rates on direct links without installing additional copper infrastructure. Another technical advantage is in utilizing crosstalk to establish an independent data link. Yet another technical advantage is an ability to establish multiple links to differently terminated customers within a common binder. Still another technical advantage is an ability to decode signals on a copper twisted pair carried over direct and crosstalk links to create multiple independent user streams. Other technical advantages may be readily apparent to and discernable by those skilled in the art from the following figures, description, and claims.

This disclosure describes a novel technique that provides higher rate service not only to the customers directly connected to the cabinets, but also to the customers that are connected on a longer loop within the same copper binder.

Figure 1:
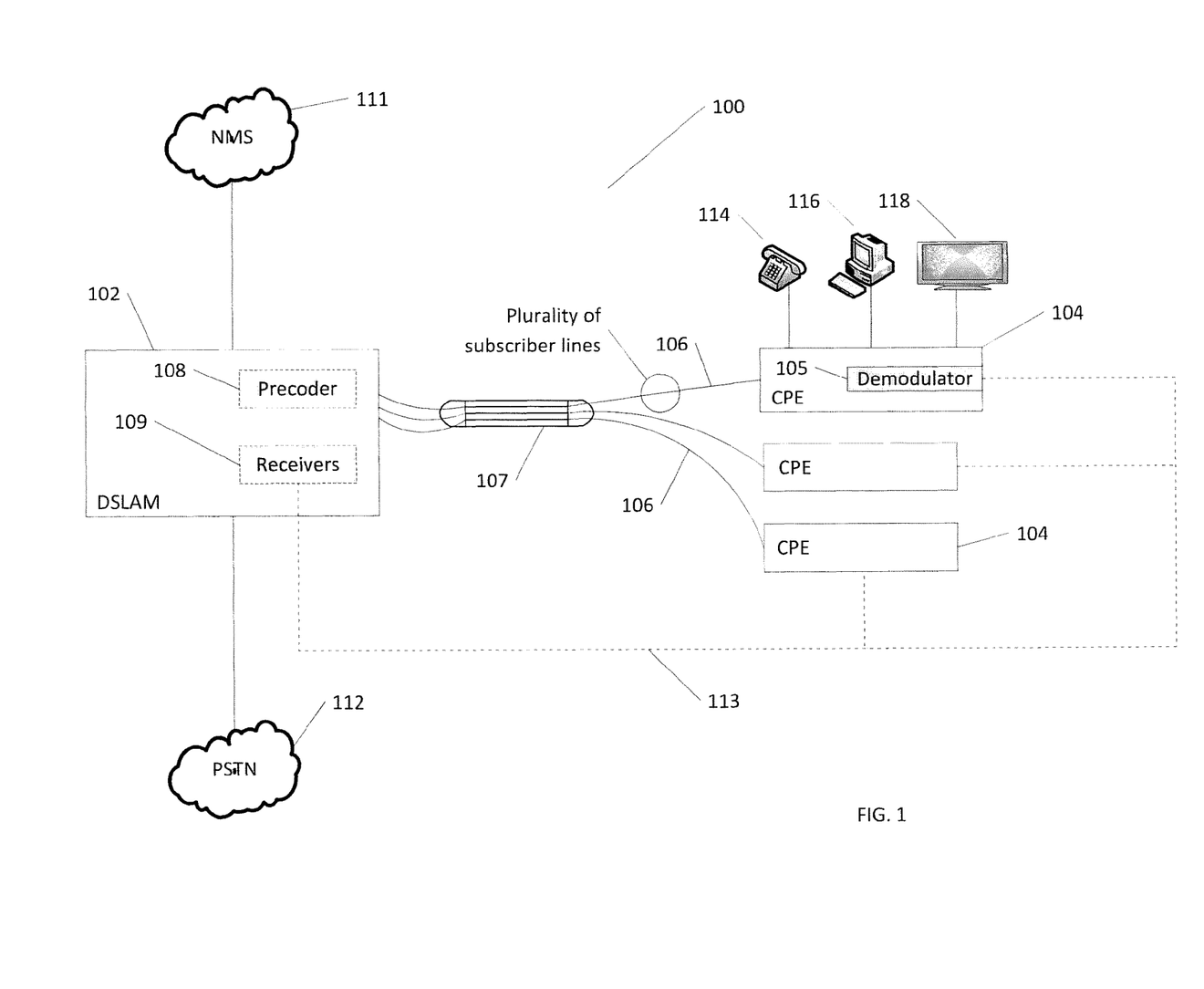
FIG. 1 illustrates a schematic diagram of an embodiment of a digital subscriber line (DSL) system.

FIG. 1 illustrates a schematic diagram of an embodiment of a Digital Subscriber Line (DSL) system 100. The DSL system 100 may be a VDSL2 system, an ADSL2 system, an ADSL2+ system, or any other DSL system (e.g., systems to be defined in the ITU-T G.fast standard). The DSL system 100 may comprise a digital subscriber line access multiplexer (DSLAM) 102 and a plurality of customer premises equipment (CPEs) 104. The CPEs 104 may be coupled to the DSLAM 102 via a plurality of subscriber lines 106. Although illustrated logically as a single line connecting each CPE 104 to the DSLAM 102, each one of the lines 106 represents a plurality of subscriber lines connected to each CPE 104. The DSLAM 102 may be located on an operator end of the DSL system 100, such as a central office (CO), an exchange, a distribution center, or a cabinet. The CPEs 104 may be located on a remote or subscriber end. At least some of the subscriber lines 106 may be bundled in a binder 107. In an embodiment, the DSLAM 102 comprises a precoder 108, which may be configured to reduce or cancel downstream FEXT, and a plurality of receivers 109, which may be configured to receive channel estimates from each of the CPEs 104. The precoder 108 may pre-distort downstream signals, which are then transmitted downstream to the CPEs 104 via the subscriber lines 106.

Each of the CPEs 104 may comprise a demodulator 105, which may be configured to equalize the downstream signals as well as generate channel estimates. The demodulator 105 may be coupled to a part of terminal unit at CPE which includes transceiver or a combination of a receiver and transmitter. The demodulator 105 may be coupled to the plurality of receivers 109 via one or more feedback channels 113. The feedback channels 113 (shown in dotted lines) may correspond to upstream logical data paths from the CPEs 104 to the DSLAM 102 and may not be physically separated from the subscriber lines 106 (shown in solid lines). Additionally, the DSLAM 102 may optionally comprise a network management system (NMS) 111 and a public switched telephone network (PSTN) 112. The NMS 111 may be a network management infrastructure that processes data exchanged with the DSLAM 102 and may be coupled to one or more broadband networks, such as the Internet. The PSTN 112 may be a network that generates, processes, and receives voice or other voice-band signals.

The precoder 108 may be configured to reduce or limit the crosstalk in the lines. The precoder 108 may transmit pre-distorted downstream signals in the subscriber lines 106 to cancel or reduce crosstalk error in the lines. The precoder 108 may process a plurality of downstream signals from a transmitter in the DSLAM 102, add distortion to the downstream signals, and transmit the pre-distorted downstream signals to the CPEs 104 via the subscriber lines 106. The pre-distorted signals may be generated by the precoder 108 which may be selected according to this disclosure. In order for the precoder 108 to be determined properly, the CPEs 104 may send back channel estimates (or error signals from which channel estimates may be derived in the DSLAM 102) derived in the downstream receivers as feedback for the precoder 108. For instance, a plurality of transceivers at the CPEs 104 may measure the errors for a plurality of received symbols, such as digital multi-tone (DMT) symbols received from the precoder 108, and transmit back to the DSLAM 102 a plurality of corresponding error feedback signals via the feedback channel 113. The feedback channel 113 may be established through upstream data signal paths from the CPEs 104 to the DSLAM 102, which may be provided in addition to upstream communications data.

In an embodiment, the CPEs 104 may be located at the customer premises, where at least some of the CPEs 104 may be coupled to a telephone 114, a computer 116, and/or a television 118. The telephone 114 may be hardware, software, firmware, or any combination thereof that generates, processes, and receives voice or other voice-band signals. The CPE 104 may comprise a switch and/or a splitter, which may couple the subscriber lines 106 and the telephone 114, the computer 116, and the television 118.

Figure 2:
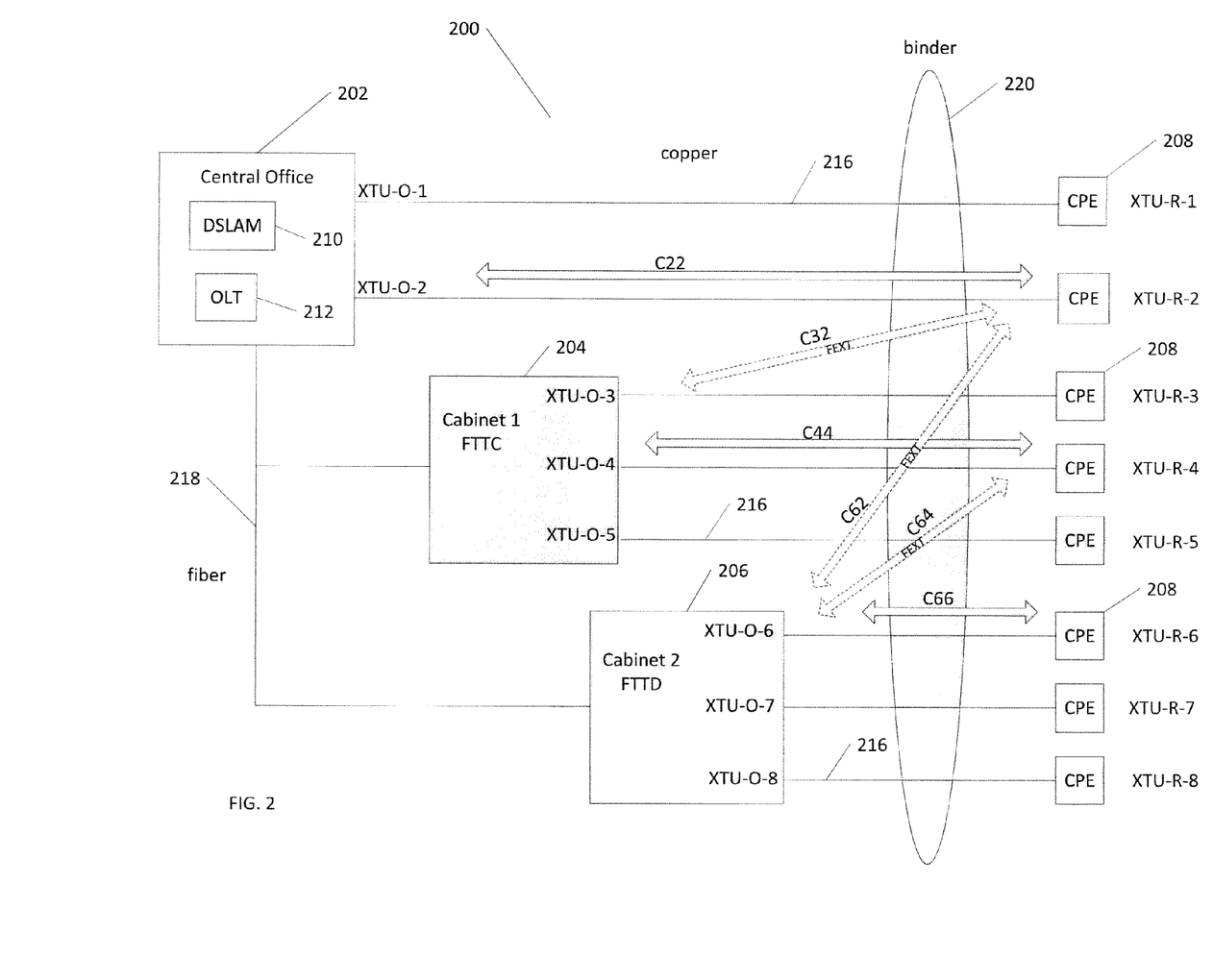
FIG. 2 illustrates customer connections within an FTTX deployment.

FIG. 2 illustrates an example FTTX deployment 200 with eight customer connections. FTTX deployment 200 includes a central office 202, FTTC Cabinet 204, a FTTD cabinet 206, and customer premises equipment (CPE) 208. Central office 202 includes a DSLAM 210 and an Optical Line terminal (OLT) 212. Central office 202 includes operator end terminal units XTU-O-1 and XTU-O-2 coupled to respective remote end terminal units XTU-R-1 and XTU-R-2 at customer premises units 208 by traditional copper lines 216 (or other crosstalk-susceptible communication links). FTTC Cabinet 204 includes operator end terminal units XTU-O-3, XTU-O-4, and XTU-O-5 coupled to respective remote end terminal units XTU-R-3, XTU-R-4, and XTU-R-5 at customer premises equipment 208 by traditional copper lines 216. FTTD Cabinet 206 includes operator end terminal units XTU-O-6, XTU-O-7, and XTU-O-8 coupled to respective remote end terminal units XTU-R-6, XTU-R-7, and XTU-R-8 at customer premises equipment 208 by traditional copper lines 216. Central office 202 couples to FTTC Cabinet 204 and FTTD Cabinet 206 by one or more fiber optic links 218.

The copper lines may be also referred to as twisted pairs and are common in telephone/DSL networks, but the discussion applies equally well to any communication lines that are susceptible to crosstalk. It is common to have twisted pairs connected to both a CO and to one or more associated cabinets, wherein the twisted pairs may be bundled into a bundle of lines or combined in a common binder. Current DSL standards require that the technologies be designed to share the frequency spectrum in the binder. In one example, service provider A has ADSL deployed from a particular CO while at the same time service provider B deploys VDSL from the associated cabinets of the CO. To coexist in the same binder, VDSL and ADSL may use non-overlapping frequency bands.

In one scenario, the existence of twisted pairs in a common binder from the CO and associated cabinets comes about due to the manner of deployment and modification of a DSL distribution network. In this example, the DSL distribution network is initially deployed as a CO, wherein all homes/CPEs are connected to the CO. Then, at a later time, the service provider installs a FTTC cabinet and the twisted pairs for some of the homes/CPEs are diverted from the CO to the newly-installed FTTC cabinet. The FTTC cabinet may be installed to improve rates to a neighborhood, for example. For the FTTC cabinet installation, the binder is cut and some of the twisted pairs going to the neighborhood are diverted to the FTTC cabinet instead of to the CO. As a result, twisted pairs from the CO and twisted pairs from the FTTC may exist in a common binder. Due to their proximity to each other in the common binder, the twisted pairs from the CO may create crosstalk in the twisted pairs from the FTTC cabinet, and vice versa. As the DSL distribution network grows, more than one such cabinet may be added to the network. Consequently, the DSL distribution network is transformed into a hybrid configuration, with twisted pairs from the CO and twisted pairs from a cabinet or cabinets running together within a common binder for at least a portion of their length, creating crosstalk possibilities.

Crosstalk comprises a signal in one communication link inducing a corresponding signal in an adjacent or nearby second communication link. Crosstalk can exist between two single links, between pairs of links, or between twisted pairs, for example. The crosstalk may comprise far end crosstalk (FEXT). In a FEXT scenario, a device or devices at a far end of a communication link from the CO (or other network device) receives crosstalk generated by another communication link, typically an adjacent or nearby communication link, such as another communication link in a common binder with the communication link.

The crosstalk may comprise out-of-band crosstalk. In some examples, out-of-band crosstalk comprises frequency-shifted crosstalk with respect to the signal of interest. In other examples, out-of-band crosstalk comprises time-shifted crosstalk with respect to the signal of interest.

In this example, the first two customers (1 and 2) are directly connected over copper lines 216 to the DSLAM 210 in central office 202, the next three customers (3-5) are directly connected to FTTC cabinet 204 over copper lines 216, and the last three customers (6-8) are directly connected to FTTD cabinet 206 over copper lines 216. For this example, all eight customers are also shown to share the same copper binder 220. Note that the terminology central office and cabinet are used to give a frame of reference regarding the length of the copper connection and the technology deployed to the customers. These terms and the technology deployed are interchangeable, based on operator preference. As shown, the customers connected to the FTTC cabinet 204 and FTTD cabinet 206 are on shorter copper loops respectively than customers connected to central office 202 and, thus, are typically able to deploy faster rate DSL technologies. In the current state-of-art architecture, the only practical way to provide higher speed service to the customers connected to the central office is to build new fiber cabinets near these customers.

As shown in FIG. 2, besides the direct links to the customers 2 and 4 (labeled as $C_{22}$ and $C_{44}$), the copper twisted pairs 216 within the binder 220 also have far end crosstalk (FEXT) coupling, shown in broken (- -) lines. The crosstalk can typically cause significant degradation in performance, if not cancelled. Today's VDSL and G.FAST modems implement techniques to cancel this crosstalk from all pairs originating from the same central office or cabinet. Additionally, today's deployments use different frequency bands to separate the signals from different cabinets. As an example, in FIG. 2, the central office 202 may deploy ADSL, FTTC cabinet 204 may deploy VDSL2, and FTTD cabinet 206 may deploy G.FAST, each occupying different or non-interfering frequency spectrums (note that any of these technologies may be interchangeably deployed from the variety of access points, including CO, cabinet, drop-point, etc., and the disclosure is equally applicable for each of the different scenarios). With such a non-interfering signaling configuration, the crosstalk link (such as $C_{32}$ and $C_{64}$) does not interfere with the signal in the direct link ($C_{22}$ and $C_{44}$, respectively).

The techniques in this disclosure include advantageously using the crosstalk signals between copper lines 216 at the central office 202, FTTC cabinet 204, and FTTD cabinet 206 to provide additional channel capabilities and enhance the rates of customers in the same binder 220, possibly on longer loops, and not directly connected on the same cabinet. In one implementation, the frequency spectrum used by the direct link and the crosstalk links are non-overlapping. At any given time, a second customer using terminal unit XTU-R-2, may transmit and/or receive communications simultaneously with central office 202 over direct link $C_{22}$, with FTTC cabinet 204 over crosstalk link $C_{32}$, and with FTTD cabinet 206 over crosstalk link $C_{62}$. With non-overlapping frequencies, it is possible to have more than one crosstalk link associated with terminal unit XTU-R-2 and FTTC cabinet 204 and FTTD cabinet 206. For example, more than one crosstalk link $C_{32}$ may be established between terminal unit XTU-R-2 and FTTC cabinet 204 as long as each such link is on a different frequency.

In another implementation, the frequency spectrums may have some overlap and the direct and crosstalk links need to be scheduled to avoid interference. As an example, scheduling of direct link $C_{22}$, crosstalk link $C_{32}$, and crosstalk link $C_{62}$ could be performed so that only one of these links is active. As a result, the second customer using terminal unit XTU-R-2 would transmit and/or receive communications with either the central office 202 over direct link $C_{22}$, or the FTTC cabinet 204 over crosstalk link $C_{32}$, or the FTTD cabinet 206 over crosstalk link $C_{62}$ at any given time. It is also possible to combine implementation of non-overlapping frequencies and overlapping frequencies for additional communication capabilities. For example, downstream communications on direct links $C_{33}$ and crosstalk link $C_{32}$ may be over non-interfering frequencies while upstream communications on direct link $C_{33}$ and crosstalk link $C_{32}$ may be on overlapping frequencies and vice versa.

In one embodiment, the rates of the second customer at terminal unit XTU-R-2 may be enhanced by using the crosstalk signals from multiple pairs, such as $C_{32}$ and $C_{62}$. In this case, the terminal unit XTU-R-2 can send/receive data on the direct link $C_{22}$ as well as on the crosstalk links $C_{32}$ and/or $C_{62}$. For example, in one embodiment the CO is configured to exchange third communications over a third communication port, with the third communication port adapted to be coupled to a third communication link, with the CO exchanging the third communications over the third communication port in order to exchange the third communications with the CPE via crosstalk from the third communication link to the first communication link. As a consequence, in this example a total communications rate for the CPE comprises a first communications rate of the first communications $C_{22}$ exchanged with the CPE, combined with a second communications rate of the second communications $C_{32}$ exchanged with the CPE via crosstalk induced in the first communication link via the second communication link, and combined with a third communications rate of the third communications $C_{62}$ exchanged with the CPE via crosstalk induced in the first communication link via the third communication link.

In another embodiment, a single copper twisted pair may be used to enhance the rates of multiple customers, simultaneously. For example, the pair on terminal unit XTU-O-6 is used to enhance the rates of both terminal unit XTU-R-2 and terminal unit XTU-R-4. As an alternative, to simplify the design, one may choose to use dedicated, unused, copper twisted pairs at the cabinet to implement these techniques. In this case, these dedicated copper twisted pairs are primarily or exclusively used for the crosstalk link (i.e., not shared by a direct link). It should be noted that to implement any of these aforementioned or other similar permutations, the copper twisted pairs may be within the same binder or bundle or may be physically proximal in order for sufficiently strong crosstalk coupling to exist.

Figure 3:
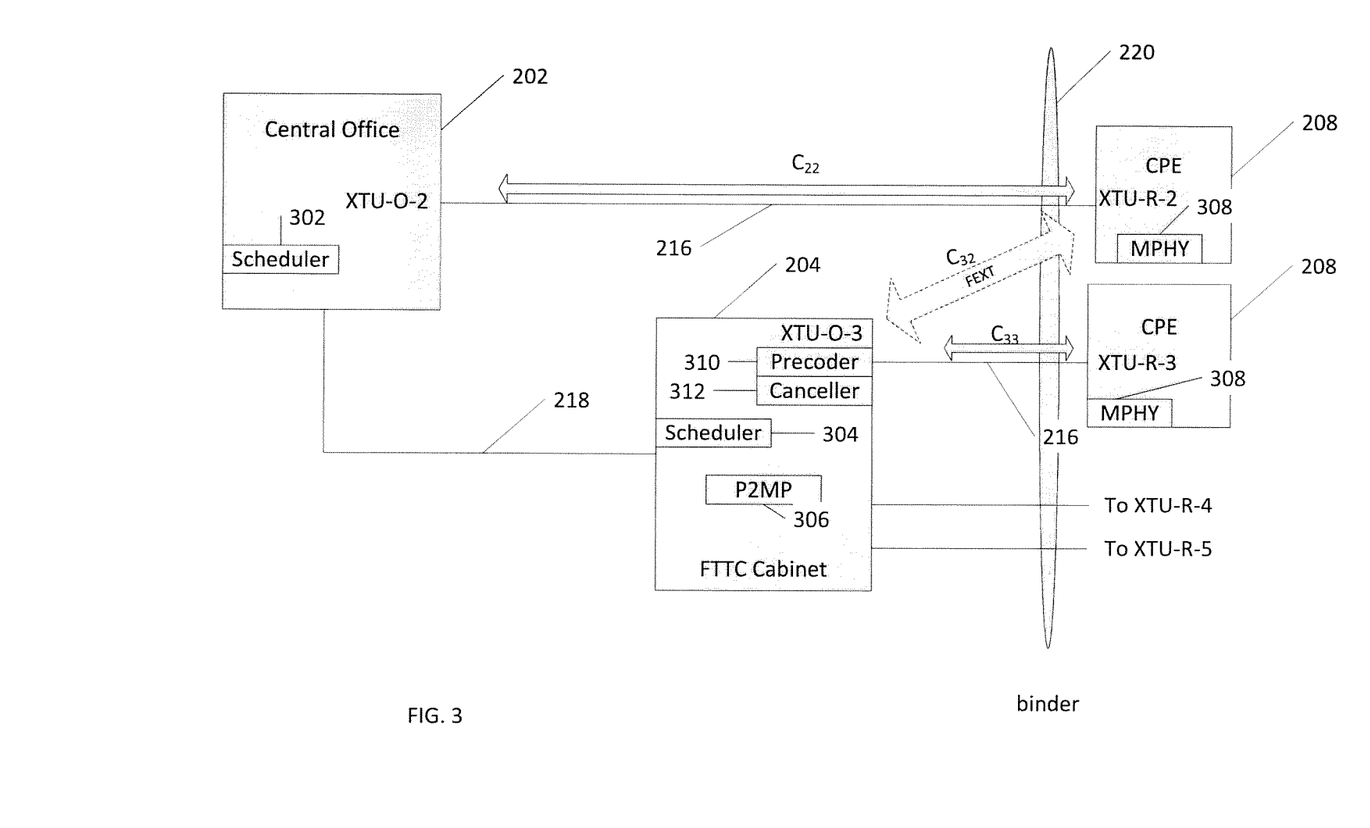
FIG. 3 shows example functional blocks for implementing multilink DSL using crosstalk coupling.

FIG. 3 shows example functional blocks for implementing multilink DSL using crosstalk coupling. Note that one may choose to implement other functional partitions and install modifications in different components to achieve the same result. For the sample configuration in FIG. 3, the multilink DSL includes components that implement an advanced traffic scheduler, a point-to-multipoint (P2MP) media access control (MAC) layer and physical (PHY) layer, and a Multi-PHY CPE.

Central office 202 includes a scheduler 302 to coordinate transmission of the communication links using overlapping frequencies. In addition, scheduler 302 may coordinate frequency allocation in establishing the communication links. Scheduler 302 of central office 202 works with a similar scheduler in the FTTX cabinets, such as scheduler 304 in FTTC cabinet 204. Schedulers 302 and 304 enable and pair the direct and crosstalk links, perform real-time traffic scheduling, and supervise priority management. Each of schedulers 302 and 304 maintain a database of available coupled links. Entries in the database may include parameters for frequency spectrum allocation for the direct and crosstalk links and timing to prevent links using the same or overlapping frequency from communicating at the same time. Schedulers 302 and 304 establish static and/or dynamic connections across coupled direct and crosstalk links. Scheduler 302 provides control signaling to the FTTX cabinets and terminal units XTU-R for coordination of the direct and crosstalk links. Scheduler 304 establishes rules for data transmission on the available copper lines. As a result, an independent data transmission capability can be established over a crosstalk link.

FTTC cabinet 204, as well as other FTTX cabinets in the network, may include a P2MP unit 306. P2MP unit 306 is used to enhance transceivers in FTTC cabinet 204 for connecting to multiple terminal units XTU-R, even those units not directly connected to FTTC cabinet 204. P2MP unit 306 establishes physical layer connectivity for its associated direct links and physical layer connectivity for crosstalk links to terminal units XTU-R not directly connected to FTTC cabinet 204. P2MP unit 306 also provides MAC layer functionality to the direct and crosstalk links. P2MP unit 306 establishes multiple links to different customers using the crosstalk link.

CPEs 208 include Multi-PHY units 308 to provide connections over the direct links and the crosstalk links. Multi-PHY unit 308 establishes the PHY layer connectivity over the direct and crosstalk links. Multi-PHY unit 308 also establishes MAC layer connectivity to source upstream traffic and to sink downstream traffic from the appropriate links. Multi-PHY unit 308 decodes signals on a copper twisted pair from both direct and crosstalk links to create two independent user streams.

FTTC cabinet 204 also includes a precoder 310 and a canceller 312. Precoder 310 and canceller 312 are used to establish crosstalk links within binder 220. Precoder 310 and canceller 312 are used in establishing a crosstalk link from a FTTX cabinet to a terminal unit XTU-R, so that a non-interfering signal can be transmitted between them. The protocol used here is a modification of the vectoring techniques as described in the current ITU G.993.5 standard. The following also touches on the P2MP concept of connecting to multiple PHY layers using a single copper twisted pair. For purposes of discussion, it is assumed that the modems from the central office 202 (i.e., XTU-O 1-2) have ADSL connections, the modems from the FTTC cabinet 204 (i.e., XTU-O 3-5) have VDSL2 connections, and the remaining modems from the FTTD cabinet 206 (i.e., XTU-O 6-8) have G.fast connections. The following is an outline of some of the basic steps that may be used to establish a crosstalk link $C_{32}$ to terminal unit XTU-R-2.

A sequence of transaction messages in a handshaking protocol is passed between central office 202 and a terminal unit XTU-R (such as XTU-R-2) at CPE 208. An example handshaking protocol is a g.HS session pursuant to ITU-T G.994.1. Parameters are exchanged between the central office 202 and terminal unit XTU-R-2 over direct link $C_{22}$ to enable crosstalk link $C_{32}$. The parameters may include channel estimates and be used to generate a parameter set relative to communications over the crosstalk link $C_{32}$ for transmission as at least part of the traffic data of XTU-R-2. The parameter set is forwarded to FTTC cabinet 204 by central office 202 via fiber link 218, which might be performed by scheduler 302. In some embodiments, the parameter set might include at least one of one or more parameters relative to frequencies or time zones on the crosstalk link $C_{32}$, one or more parameters relative to bit allocation, one or more parameters relative to control routine such as power control, timing, error control, etc. FTTC cabinet 204 adds terminal unit XTU-R-2 to its vectored modem pool and implements a P2MP protocol to share direct link $C_{33}$ between terminal unit XTU-R-2 and terminal unit XTU-R-3. To reduce complexity at the terminal units XTU-R, transmissions from FTTC cabinet 204 are made synchronous to a clock at central office 202. Central office 202 provides sampling clock information to FTTC cabinet 204 to drive its phase locked loop circuit.

In some embodiments, the central office 202 may transmit a first part of traffic data for transmission to the XTU-R-2 over the direct link $C_{22}$ to the XTU-R-2 and a second part of the traffic data for transmission to the XTU-R-2 to the FTTC cabinet 204, such that the second part of the traffic data can be transmitted by the FTTC cabinet 204 to the XTU-R-2 via the crosstalk link $C_{32}$. Correspondingly, XTU-R-2 may receive signals on the copper pair 216, which carry both the first part of the traffic data over the direct link $C_{22}$ and the second part of the traffic data over the crosstalk link $C_{37}$. Similarly, parameters can be exchanged between the central office 202 and terminal unit XTU-R-2 over direct link $C_{22}$ to enable crosstalk link $C_{62}$ and generate a parameter set for communications over the crosstalk link $C_{62}$. The parameter set may be forwarded from the central office 202 to FTTD cabinet 206, and a third part of the traffic data for transmission to the XTU-R-2 can be transmitted from the central office 202 to the FTTD cabinet 206 and then transmitted to XTU-R-2 over the crosstalk link $C_{62}$. In this way, the crosstalk links are effectively utilized to achieve a higher data rate of XTU-R-2. The signals transmitted over crosstalk links may occupy different or non-interfering frequency spectrums from that over direct link $C_{22}$, and do not interfere with the signal in the direct link $C_{22}$.

Crosstalk link $C_{32}$ may be set up as a downstream only link, an upstream only link, or a full duplex link. If crosstalk link $C_{32}$ is a downstream only link, any related uplink traffic is multiplexed by terminal unit XTU-R-2 in direct link $C_{22}$. Relevant information (such as EOC messages, clipped error samples, and other control information) in the uplink traffic is relayed by central office 202 to FTTC cabinet 204.

Figure 4A:
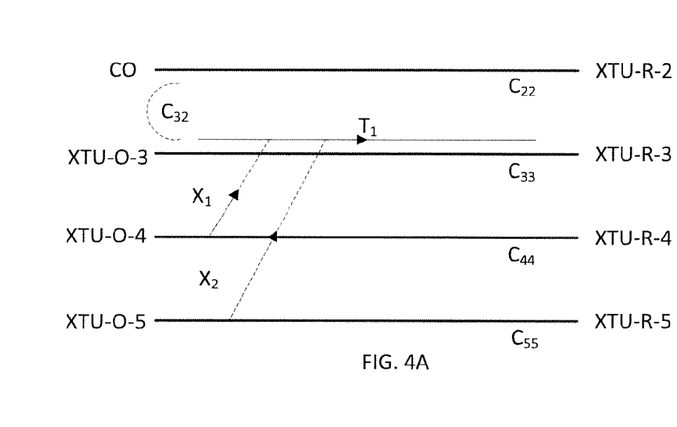
FIGS. 4A and 4B illustrate example procedures in establishing a downstream crosstalk link in the DSL system.
Figure 4B:
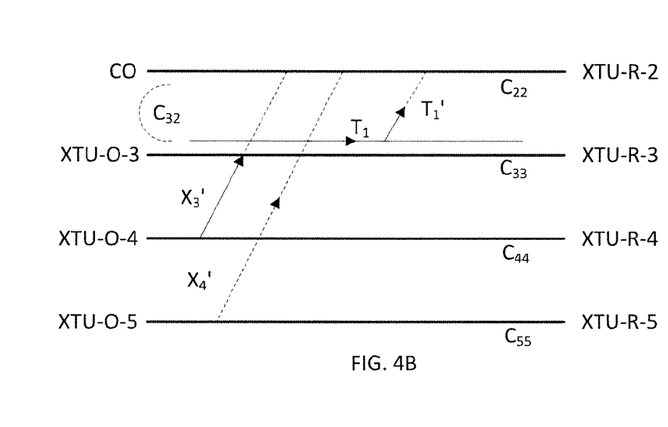

FIGS. 4A and 4B depict example procedures in establishing a downstream crosstalk link $C_{32}$ in the DSL system. FIGS. 4A and 4B show some high level details of the protocols and procedures that may be used to initiate and provide a better understanding of multilink out-of-band FEXT coupling. In addition to initially setting up crosstalk link $C_{32}$ as provided above, FTTC cabinet 204 performs precoder training to not only eliminate unwanted crosstalk interference but also to recognize desired traffic on crosstalk link $C_{32}$. Precoder 310 in FTTC cabinet 204 performs training for its terminal units XTU-O on its direct links 3-5 as shown in FIG. 4A and training on terminal unit XTU-R-2 as shown in FIG. 4B. For the example shown, terminal unit XTU-O-3 takes turns training the direct links and the crosstalk link.

Precoder 310 uses precoding coefficients to modify signals in the lines and transmits the pre-distorted signals downstream from FTTC cabinet 204 to the CPEs 208. The introduced pre-distortions in the signals substantially cancel the crosstalk in the signals that are received by the CPEs 208. The precoder is trained or initialized using error feedback signals from the CPEs 208, which indicate the crosstalk coupled in the received signals at the CPEs 208. To train the precoder as shown in FIG. 4A, terminal unit XTU-O-3 sends a sequence of pilot symbols $T_1$ downstream to terminal unit XTU-R-3 over direct link $C_{33}$. Terminal unit XTU-R-3 receives pilot symbols $T_1$ and crosstalk symbols $X_1$ and $X_2$ from links $C_{44}$ and $C_{55}$. Terminal unit XTU-R-3 returns corresponding error feedback signals to precoder 310. The error feedback signals are then used by precoder 310 to update precoding matrix coefficients and thus adjust the pre-distorted signals until reaching convergence. In this manner, crosstalk symbols $X_1$ and $X_2$ are eliminated from the $T_1$ signal received at the terminal unit XTU-R-3.

In FIG. 4B, training is performed on the downstream crosstalk link. Terminal unit XTU-O-3 sends a sequence of pilot symbols $T_1$ downstream to terminal unit XTU-R-3 over direct link $C_{33}$. Terminal unit XTU-R-2 receives a crosstalk signal $T_1'$ of pilot symbols $T_1$ and cross talk signals $X_3'$ and $X_4'$ from links $C_{44}$ and $C_{55}$. Terminal unit XTU-R-2 returns corresponding error feedback signals to precoder 310 through central office 202. The error feedback signals are then used by precoder 310 to update precoding matrix coefficients and thus adjust the pre-distorted signals accordingly. As a result, precoder 310 maintains an additional set of precoder coefficients for the downstream crosstalk link to terminal unit XTU-R-2 and uses these coefficients when the downstream crosstalk link is activated for data transmission. In this manner, crosstalk symbols $X_3'$ and $X_4'$ are eliminated from the $T_1'$ signal received at the terminal unit XTU-R-2.

Figure 5A:
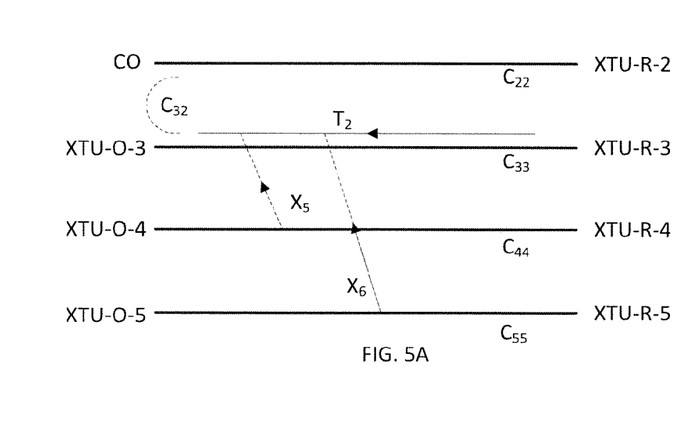
FIGS. 5A and 5B illustrate example procedures in establishing an upstream crosstalk link in the DSL system.
Figure 5B:
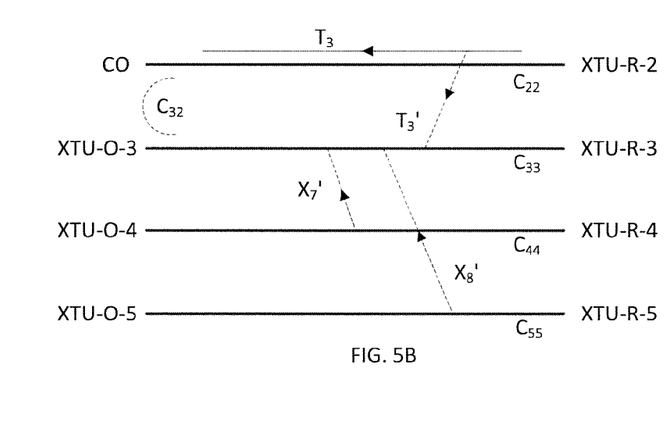

FIGS. 5A and 5B depict example procedures in establishing an upstream crosstalk link $C_{32}$ in the DSL system. Canceller 312 in FTTC cabinet 204 is used for uplink crosstalk cancellation. In addition to initially setting up crosstalk link $C_{32}$ as provided above, FTTC cabinet 204 performs canceller training to not only eliminate unwanted crosstalk interference but also to recognize desired traffic on crosstalk link $C_{32}$. Canceller 312 in FTTC cabinet 204 performs training for its terminal units XTU-O on its direct links 3-5 as shown in FIG. 5A and training on terminal unit XTU-R-2 as shown in FIG. 5B.

Uplink crosstalk canceller training is similar to precoder training. Terminal Unit XTU-O-3 performs separate canceller training for both terminal units XTU-R-2 and XTU-R-3 sharing the crosstalk link. For the example shown, terminal unit XTU-O-3 takes turns training the direct links and the crosstalk link.

To train the canceller as shown in FIG. 5A, terminal unit XTU-R-3 sends a sequence of pilot symbols $T_2$ downstream to terminal unit XTU-O-3 over direct link $C_{33}$. Terminal unit XTU-O-3 receives pilot symbols $T_2$ and crosstalk symbols $X_5$ and $X_6$ from links $C_{44}$ and $C_{55}$ and returns corresponding error feedback signals to canceller 312. The error feedback signals are then used by canceller 312 to update canceller matrix coefficients and thus adjust the received signals until reaching convergence. In this manner, crosstalk symbols $X_5$ and $X_6$ are eliminated from the $T_2$ signal received at the terminal unit XTU-O-3.

In FIG. 5B, training is performed on the upstream crosstalk link $C_{32}$. Terminal unit XTU-R-2 sends a sequence of pilot symbols $T_3$ upstream to central office 202 over direct link $C_{22}$. Terminal unit XTU-O-3 receives on link $C_{33}$ a crosstalk signal $T_3'$ of pilot symbols $T_3$ and crosstalk signals $X_7'$ and $X_8'$ from links $C_{44}$ and $C_{55}$ and returns corresponding error feedback signals to canceller 312. The error feedback signals are then used by canceller 312 to update canceller matrix coefficients and thus adjust the received signals accordingly. As a result, canceller 312 maintains an additional set of canceller coefficients for the upstream crosstalk link from terminal unit XTU-R-2 and uses these coefficients when the upstream crosstalk link is activated for data transmission. In this manner, crosstalk symbols $X_7'$ and $X_8'$ are eliminated from the $T_3'$ signal received at the terminal unit XTU-O-3.

The above procedures may be applied for establishing additional crosstalk links, for example crosstalk link $C_{62}$ from FTTD cabinet 206 to terminal unit XTU-R-2.

Figure 6:
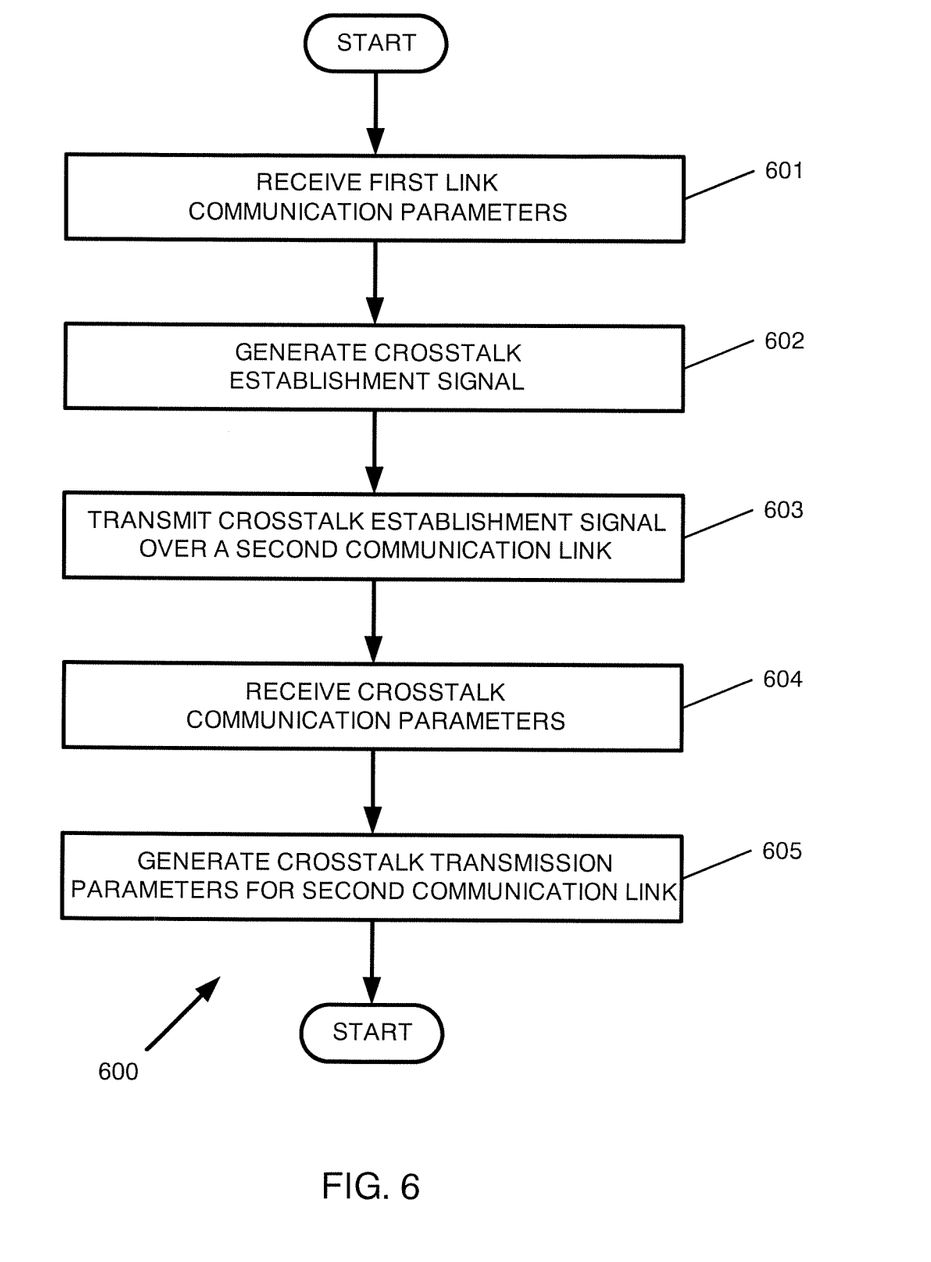
FIG. 6 is a flowchart of a method for providing twisted pair multilink communications.

FIG. 6 is a flowchart of a method for providing twisted pair multilink communications. The steps discussed below refer to a communication device performing the steps. It should be understood that the method can be performed by a communication device comprising a fiber cabinet (such as a FTTC or a FTTD) or by a communication device comprising a CO. In step 601, the communication device receives first link communication parameters of a first communication link. The communication device can receive the first link communication parameters via the CO, for example, if the communication device comprises a fiber cabinet.

In step 602, the communication device generates a crosstalk establishment signal based on the first link communication parameters. The crosstalk establishment signal comprises a signal designed for establishing a crosstalk link to the first communication link. The crosstalk establishment signal can be constructed to generate crosstalk of a desired signal strength, signal quality, or according to other crosstalk characteristics.

In step 603, the communication device transmits the crosstalk establishment signal over a second communication link. The second communication link may be located in a common binder with the first communication link for at least a portion of a length of the second communication link or may be sufficiently physically proximal to generate crosstalk.

In step 604, the communication device receives crosstalk communication parameters of the first communication link. The received crosstalk communication parameters comprise communication parameters of the first communication link. The crosstalk communication parameters are received in response to the communication device transmitting the crosstalk establishment signal over the second communication link. The received crosstalk communication parameters are related to crosstalk signals generated in the first communication link as a result of transmitting the crosstalk establishment signal over the second communication link. The communication device receives the crosstalk communication parameters from the CO, for example, if the communication device comprises a fiber cabinet.

In step 605, the communication device generates crosstalk generation parameters based on the received crosstalk communication parameters of the first communication link. In some examples, the crosstalk generation parameters include precoder coefficients and/or digital filter coefficients. The crosstalk generation parameters are selected to provide crosstalk between communication links. In some examples, the crosstalk generation parameters can enhance the signal strength and/or signal quality of crosstalk. The crosstalk generation parameters can be generated to be used for any communication link in a common binder, or can be generated to be used by a specific communication link or pair of communication links. The crosstalk generation parameters are generated for use with crosstalk-intended communications that are exchanged over the second communication link. The crosstalk generation parameters can be used in future exchanges of communications over the second communication link wherein crosstalk to the first communication link is intended to be generated. The crosstalk generation parameters can be used to ensure crosstalk is generated from the second communication link to the first communication link. In some examples, the crosstalk generation parameters can be used to increase the signal magnitude and/or signal quality of crosstalk generated from the second communication link to the first communication link.

Figure 7:
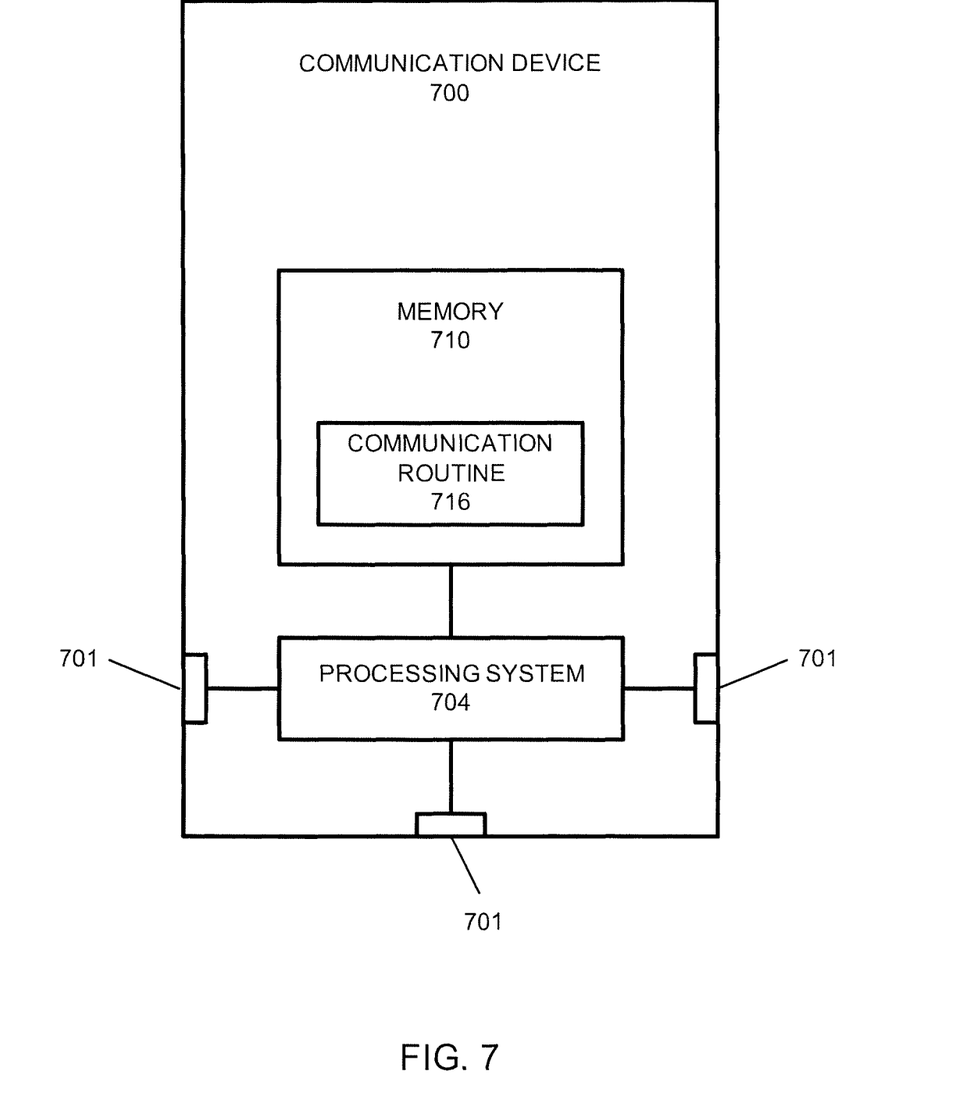
FIG. 7 shows a communication device.

FIG. 7 shows a communication device 700. The communication device 700 comprises a CO in some examples. In other examples, the communication device 700 comprises a fiber cabinet. The communication device 700 in the example shown includes one or more communication ports 701, a processing system 704 coupled to the one or more communication ports 701, and a memory 710 coupled to the processing system 704. The memory 710 stores a communication routine 716, among other things. The processing system 704 retrieves and executes the communication routine 716.

The communication device 700 in one example comprises a CO or a fiber cabinet. When executing the communication routine 716, the processing system 704 in one example is configured to exchange first communications over a first communication port 701, with the first communication port 701 adapted to be coupled to a first communication link and a customer premises equipment (CPE), and exchange second communications over a second communication port 701, with the second communication port 701 adapted to be coupled to a second communication link. The CO or fiber cabinet exchanges the second communications over the second communication port 701 in order to exchange the second communications with the CPE via crosstalk from the second communication link to the first communication link. A total communications rate for the CPE comprises a first communications rate of the first communications exchanged with the CPE combined with a second communications rate of the second communications exchanged with the CPE via crosstalk induced in the first communication link.

In another example, when executing the communication routine 716, the processing system 704 is configured to exchange first communications with a first CPE for transmission of traffic data of the first CPE over a first communication link on a first twisted pair and exchange second communications with a second CPE for transmission of at least part of traffic data of the second CPE over a second communication link that is a crosstalk link induced by the first twisted pair to the second twisted pair.

Where the communication device comprises a CO, a fiber cabinet (such as a FTTC or FTTD) may be interposed between the CO and the second communication link. The CO in this example exchanges communications with the second communication link through the interposed fiber cabinet.

The communication device 700 in another example comprises a CPE. When executing the communication routine 716 the processing system 704 is configured to exchange first communications over a first communication port 701 adapted to be coupled to a first communication link coupled to a CO, and exchange second communications over a second communication port 701 adapted to be coupled to a second communication link. The CPE 20 exchanges the second communications over the second communication port 701 in order to exchange the second communications with the CO via crosstalk from the second communication link to the first communication link. A total communications rate for the CPE comprises a first communications rate of the first communications exchanged with the CO combined with a second communications rate of the second communications exchanged with the CO via crosstalk induced in the first communication link.

To summarize, this disclosure describes a system and method that uses crosstalk signals between communication links to improve the rates of customers. The disclosure enhances the rates by using the additional useable spectrum that is available on a crosstalk link or links. The techniques described in this disclosure may be leveraged by a network operator to provide higher rate service to more customers and thus better justify the large capital cost of new cabinet installations.

In some embodiments, some or all of the functions or processes of the one or more of the devices and other hardware devices discussed above are implemented or supported by a computer program that is formed from computer readable program code and that is embodied in a computer readable medium and executed by a processor. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A communication system for providing twisted pair multilink communications, the communication system comprising:
   a first operator end terminal unit configured to:
      couple to a first customer premises equipment (CPE) via a first twisted pair; and
      exchange first communications with the first CPE for transmission of a first part of traffic data of the first CPE over a first communication link on the first twisted pair;
   and a second operator end terminal unit configured to:
      couple to a second CPE via a second twisted pair;
      determine to purposefully exchange second communications with the first CPE for transmission of a second part of the traffic data of the first CPE over a second communication link that is a crosstalk link induced between the second twisted pair and the first twisted pair; and exchange the second communications with the first CPE over the second communication link, wherein a total communications rate for the first CPE comprises a first communications rate of the first communications combined with a second communications rate of the second communications.

2. The communication system of claim 1, wherein the second operator end terminal unit is further configured to frequency shift or time shift the second communications with respect to the first communications.

3. The communication system of claim 1, wherein the first operator end terminal unit is further configured to:
   get a parameter set relative to the second communications over the crosstalk link based on parameters related to the first communication link on the first twisted pair; and
   feedback the parameter set to the second operator end terminal unit.

4. The communication system of claim 1, wherein the first operator end terminal unit and the second operator end terminal unit are located in a same physical location.

5. The communication system of claim 1, wherein the first operator end terminal unit and the second operator end terminal unit are located in different physical locations.

6. The communication system of claim 1, wherein the second operator end terminal unit is further configured to exchange the second communications with the first CPE.

7. A communication device for providing twisted pair multilink communications, the communication device comprising:
- a first operator end terminal unit configured to couple to a first customer premises equipment(CPE) via a first twisted pair;
- a second operator end terminal unit that configured to couple to a second CPE via a second twisted pair,
- wherein the first operator end terminal unit is configured to:
  - exchange first communications with the first CPE for transmission of a first part of traffic data of the first CPE over a first communication link on the first twisted pair;
  - determine to purposefully exchange second communications with the second CPE for transmission of a second part of the traffic data of the second CPE over a second communication link that is a crosstalk link induced between the first twisted pair and the second twisted pair; and
  - exchange the second communications with the second CPE over the second communication link,
  - wherein a total communications rate for the traffic data comprises a first communications rate of the first communications combined with a second communications rate of the second communications.

8. The communication device of claim 7, wherein the second operator end terminal unit is further configured to exchange third communications with the second CPE over a third communication link on the second twisted pair, and wherein the first operator end terminal unit is further configured to frequency shift or time shift the second communications with the third communications.

9. The communication device of claim 7, wherein the first operator end terminal unit is further configured to:
- obtain a parameter set relative to the second communications over the crosstalk link based on parameters related to the first communication link on the first twisted pair; and
- feedback the parameter set to the second operator end terminal unit.

10. The communication device of claim 7, wherein the first operator end terminal unit comprises:
- a memory configured to store a communication routine; and
- a processing system coupled to the memory, wherein the processing system when executing the communication routine is configured to exchange the first communications with the first CPE and exchange the second communications with the second CPE.

11. The communication device of claim 7, wherein the communication device is a fiber to the curb (FTTC) cabinet.

12. The communication device of claim 7, wherein the first operator end terminal unit is further configured to exchange the second communications with the second CPE.

13. A communication device for providing twisted pair multilink communications, comprising:
- a memory storing a communication routine; and
- a processing system coupled to the memory, wherein the processing system when executing the communication routine is configured to:
  - exchange first communications over a first communication port, with the first communication port adapted to be coupled to a first communication link and a customer premises equipment (CPE); and
  - exchange second communications over a second communication port, with the second communication port adapted to be coupled to a second communication link, with the communication device exchanging the second communications over the second communication port in order to exchange the second communications with the CPE via crosstalk in a crosstalk link from the second communication link to the first communication link,
  - wherein a total communications rate for the CPE comprises a first communications rate of the first communications exchanged with the CPE combined with a second communications rate of the second communications exchanged with the CPE via crosstalk induced in the first communication link.

14. The communication device of claim 13, wherein the second communications are frequency-shifted or time-shifted with respect to the first communications.

15. The communication device of claim 13, wherein the processing system is configured to receive a parameter set relative to the second communications over the crosstalk link from the CPE.

16. A method for providing twisted pair multilink communications, the method comprising:
- in a communication device, exchanging first communications over a first communication port and a first communication link with a customer premises equipment (CPE), with the first communication link coupling the CPE to the communication device; and
- in the communication device, exchanging second communications over a second communications port and second communication link, with the communication device exchanging the second communications over the second communication link in order to exchange the second communications with the CPE via crosstalk in a crosstalk link from the second communication link to the first communication link,
- wherein a total communications rate for the CPE comprises a first communications rate of the first communications exchanged with the CPE combined with a second communications rate of the second communications exchanged with the CPE via crosstalk induced in the first communication link.

17. The method of claim 16, wherein the second communications are frequency-shifted or time-shifted with respect to the first communications.

18. The method of claim 16, further comprising, in the communication device, receiving a parameter set relative to the second communications over the crosstalk link from the CPE.

19. A communication device for providing twisted pair multilink communications, the communication device comprising:
- a memory configured to store a communication routine; and
- a processing system coupled to the memory, wherein the processing system when executing the communication routine is configured to:
  - transmit a crosstalk establishment signal over a second communication link;
  - receive over the second communication link crosstalk communication parameters of a first communication link in response to the crosstalk establishment signal, wherein the crosstalk communication parameters are related to crosstalk signals generated in the first communication link as a result of the crosstalk establishment signal;
  - generate crosstalk transmission parameters based on the crosstalk communication parameters in order to purposefully induce crosstalk-intended transmissions from the second communication link to the first communication link; and transmit the crosstalk transmission parameters over the second communication link, wherein a total communications rate for the communication device comprises a first communications rate of the first communication link combined with a second communications rate of a crosstalk link from the second communication link to the first communication link.

20. The communication device of claim 11, wherein the processing system is further configured to:

receive first link communication parameters of the first communication link; and generate the crosstalk establishment signal based on the first link communication parameters.

21. The communication device of claim 19, wherein the crosstalk transmission parameters enhance a signal strength, a signal magnitude, or a signal quality of crosstalk from the second communication link to the first communication link.

22. A method for establishing twisted pair multilink communications and implemented in a communication device, the method comprising:

transmitting a crosstalk establishment signal over a second communication link;

receiving over the second communication link crosstalk communication parameters of a first communication link in response to the crosstalk establishment signal, wherein the crosstalk communication parameters are related to crosstalk signals generated in the first communication link as a result of the crosstalk establishment signal;

generating crosstalk transmission parameters based on the crosstalk communication parameters in order to purposefully induce crosstalk-intended transmissions from the second communication link to the first communication link; and transmitting the crosstalk transmission parameters over the second communication link, wherein a total communications rate for the communication device comprises a first communications rate of the first communication link combined with a second communications rate of a crosstalk link from the second communication link to the first communication link.

23. The method of claim 22, further comprising:

receiving first link communication parameters of the first communication link; and generating the crosstalk establishment signal based on the first link communication parameters.

* * * * *